United States Patent [19]

Iwai et al.

[11] Patent Number: 4,747,796

[45] Date of Patent: May 31, 1988

[54] SMOOTHING DEVICE FOR ROTATION OF PROPELLER OF BOAT PROPULSION MACHINE

[75] Inventors: Tomio Iwai, Hamamatsu; Minoru Kawamura, Iwata, both of Japan

[73] Assignee: Sanshin Kogyo Kabushiki Kaisha, Japan

[21] Appl. No.: 919,604

[22] Filed: Oct. 14, 1986

Related U.S. Application Data

[63] Continuation of Ser. No. 722,227, Apr. 11, 1985, abandoned.

[30] Foreign Application Priority Data

Apr. 12, 1984 [JP] Japan .................. 59-71846

[51] Int. Cl.⁴ ........................................... B63H 21/28
[52] U.S. Cl. ........................................ 440/83; 440/52; 440/900; 464/97; 464/160; 464/180; 464/73
[58] Field of Search .................. 440/52, 75, 83, 86, 440/900, 113; 464/97, 180, 182, 160, 161, 73, 74, 76, 83, 84, 85, 86, 89, 38, 39, 100, 101

[56] References Cited

U.S. PATENT DOCUMENTS

| | | | |
|---|---|---|---|
| 2,209,301 | 7/1940 | Johnson et al. | 440/52 X |
| 2,446,942 | 10/1948 | McFarland | 464/74 |
| 2,616,274 | 11/1952 | Landrum | 464/160 X |
| 2,691,283 | 10/1954 | Stover | 464/180 X |
| 2,772,649 | 12/1956 | Gensheimer et al. | 440/52 |
| 2,891,395 | 6/1959 | Chater | 464/89 X |
| 2,950,701 | 8/1960 | Stefani | 440/52 |
| 3,408,830 | 11/1968 | Sutaruk et al. | 464/180 X |
| 3,501,929 | 3/1970 | Kashmerick | 440/52 X |
| 3,808,838 | 5/1974 | Bowen et al. | 464/89 |
| 4,269,043 | 5/1981 | Kizu et al. | 464/83 |
| 4,378,219 | 3/1983 | Tanaka | 440/75 |
| 4,583,953 | 4/1986 | Nakase | 440/52 |

FOREIGN PATENT DOCUMENTS

| | | | |
|---|---|---|---|
| 156493 | 9/1983 | Japan | 440/52 |
| 104495 | 6/1985 | Japan | 440/52 |
| 203010 | 10/1923 | United Kingdom | 464/160 |
| 263229 | 12/1926 | United Kingdom | 464/97 |
| 934082 | 6/1982 | U.S.S.R. | 464/84 |

Primary Examiner—Joseph F. Peters, Jr.
Assistant Examiner—Paul E. Salmon
Attorney, Agent, or Firm—Ernest A. Beutler

[57] ABSTRACT

Several embodiments of coupling devices for marine outboard drives for providing a coupling between an engine output shaft and the outboard drive, drive shaft. Each embodiment employs as the coupling a first portion that provides a relatively resilient driving connection for absorbing low speed torque vibrations and a second more rigid driving connection for providing a more positive power transmission at high speeds and high loads. In some embodiments, the more resilient connection is provided by a spring which may comprise either a torsional spring or a torsional coil spring. In other embodiments, elastomeric elements provide the driving connection.

6 Claims, 4 Drawing Sheets

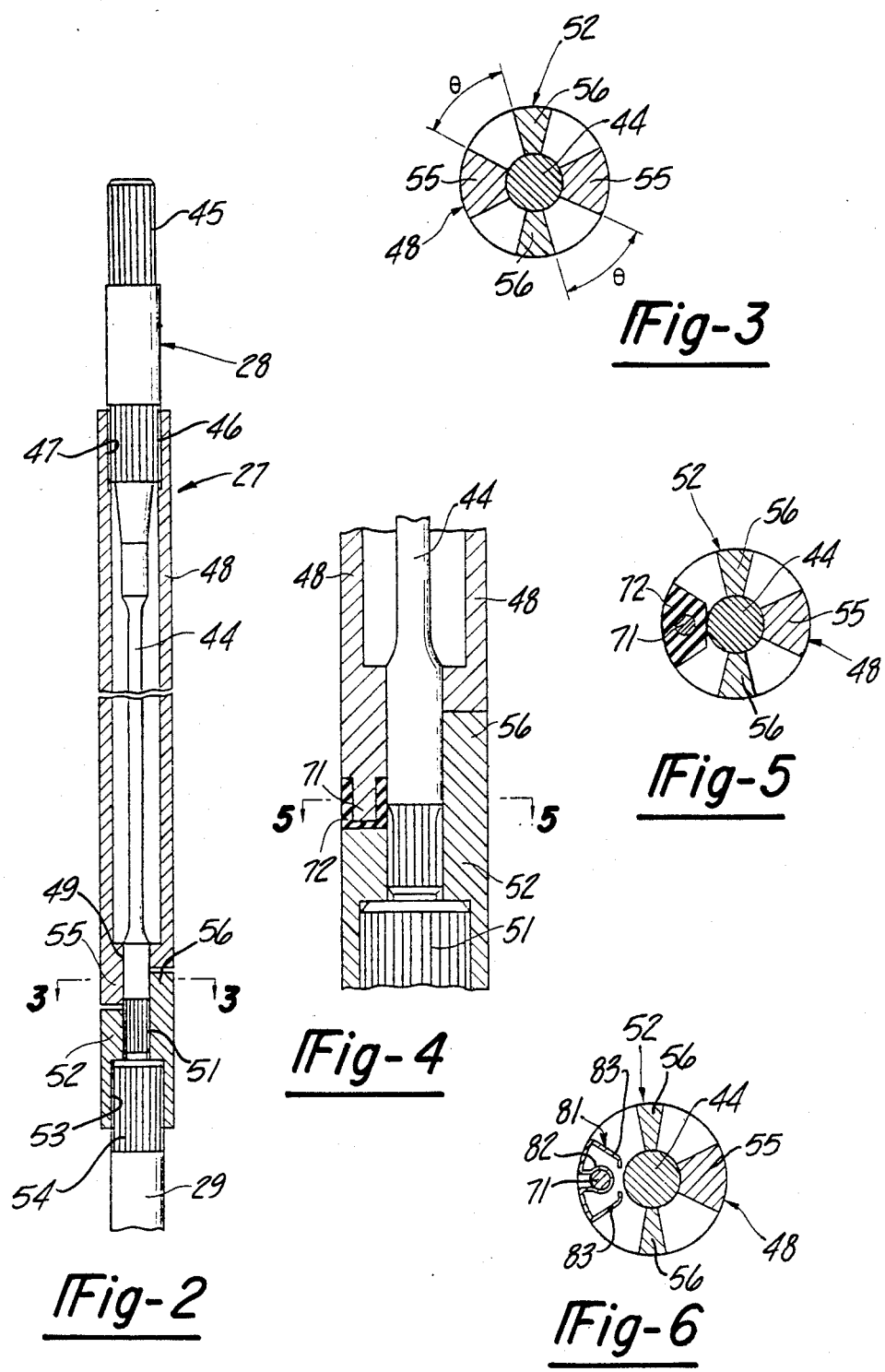

SMOOTHING DEVICE FOR ROTATION OF PROPELLER OF BOAT PROPULSION MACHINE

This is a continuation of U.S. patent application Ser. No. 722,227, filed Apr. 11, 1985, now abandoned.

BACKGROUND OF THE INVENTION

This application relates to a smoothing device for rotation of propeller of boat propulsion machine and more particularly to an improved device for preventing vibration transmission in a marine outboard drive.

As is well known, marine propulsion units such as outboard motors or inboard-outboard drives are caused to propel the associated watercraft over a wide variety of speeds and varying conditions. Normally, a reciprocating engine or engine having intermittent firing is employed as the power plant for driving the drive shaft and propeller regardless of whether the marine drive is an outboard motor per se or an inboard-board unit. When operating at low speeds, the intermittent firing of the power unit gives rise to intermittent power impulses to the drive shaft and, accordingly, the propeller shaft. Such intermittent power pulses give rise to vibrations which can be transmitted back to the associated watercraft and also gives rise to fluctuations in torque of the driving propeller that can cause oscillations of the boat about an axis defined by the outboard drive steering shaft.

It is, therefore, a principal object of this invention to provide an improved device for smoothing the pulses of a marine outboard drive.

It is a further object of this invention to provide an improved vibration damping coupling.

SUMMARY OF THE INVENTION

This invention is adapted to be embodied in a marine drive having an output shaft driven by an engine having firing impulses, a drive shaft adapted to drive a propeller shaft for powering an associated watercraft and coupling means for drivingly coupling the output shaft and the drive shaft. In accordance with this feature of the invention, the coupling means provides a first relatively low torsional resilience to absorb low speed vibrations and a second substantially higher torsional resilience to transmit high driving loads.

Another feature of the invention is adapted to be embodied in a coupling having first and second axially spaced rotating shafts. The first and second shafts are rotatably coupled by a first torsionally resistant member that is operatively connected for rotation with each of the shafts. A second member havng substantially higher torsional resilience than the first member is rotatably coupled to the first shaft at one of its ends and has a lost motion connection to the other of the shafts at the other of its ends.

Another feature of the invention is adapted to be embodied in a driving coupling for drivingly coupling first and second rotating shafts. The first shaft has a pilot portion that is journaled within the second shaft for rotation of the first and second shafts about a common axis. A first coupling element is non-rotatably affixed to the first shaft and has a lost motion connection with the second shaft. A compression spring urges the first coupling element into frictional engagement with the second shaft for establishing a frictional drive between the first and second shafts that has substantially greater torsional resilience than that provided for by the lost motion connection.

Yet another feature of the invention is adapted to be embodied in rotatable coupling for coupling first and second rotating shafts. The coupling includes a torsional coil spring clutch operatively interposed between the first and second shafts for transmitting a drive therebetween in a first direction. In addition, lost motion means including positively engaging elements are interposed between the first and second members so as to provide a more rigid drive upon a predetermined yielding of the torsional clutch.

A yet further feature of the invention is also adapted to be embodied in a coupling for rotatably coupling first and second shafts for rotation about an axis. The first and second shafts have positively engaging elements that are normally spaced apart. Elastomeric elements are disposed between the shafts and are adapted to transmit rotational force between the shafts and before the positively engaging elements are engaged with each other. The elastomeric element has substantial torsional resiliency so as to premit yielding thereof so that the positively engaging elements can engage to permit large driving forces to be transmitted positively between the shafts.

BRIEF DESCRIPTION OF THE DRAWINGS

FIG. 2 is an enlarged cross-sectional view showing a coupling constructed in accordance with a first embodiment of the invention.

FIG. 3 is a cross-sectional view, on an enlarged scale, taken generally in the direction of the line 3—3 of FIG. 2.

FIG. 4 is a cross-sectional view, in part similar to FIG. 2, showing another embodiment of the invention.

FIG. 5 is an enlarged cross-sectional view taken along the line 5—5 of FIG. 4.

FIG. 6 is a cross-sectional view, in part similar to FIG. 5, showing another embodiment of the invention.

DETAILED DESCRIPTION OF THE PREFERRED EMBODIMENTS

Figure 1:
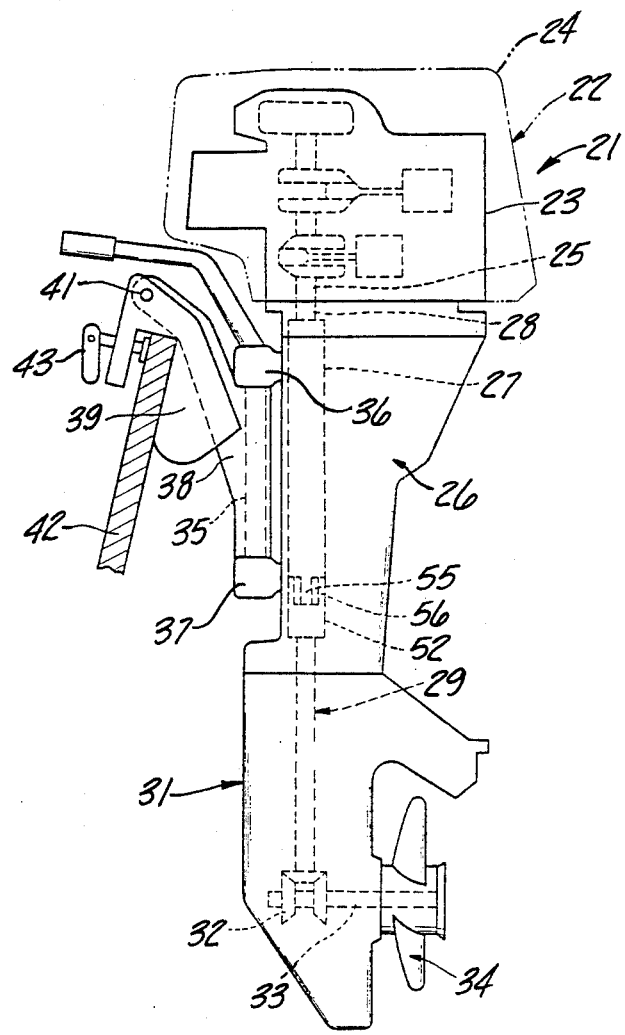
FIG. 1 is a side elevational view of an outboard motor showing a typical environment in which the invention may be employed.

Referring first to FIG. 1, the general environment of the invention is illustrated in connection with an outboard motor, indicated generally by the reference numeral 21. Although the invention is described in conjunction with an outboard motor, it should be readily apparent to those skilled in the art that the invention is equally applicable to the outboard drive unit of a marine unit of an marine inboard-outboard driving mechanism. The invention has particularly utility, however, in conjunction with devices wherein the powering internal combustion engine has a relatively few number of combustion chambers or cylinders since the device is particularly adapted to absorb the pulsations generated by the individual firings of the chambers at low speeds.

The outboard motor 21 includes a power head, indicated generally by the reference numeral 22, including an internal combustion engine 23 and a surrounding protective cowling 24. The engine 23 in the illustrated embodiment is of the two cylinder inline type. It is to be understood, however, that the invention can be used in conjunction with engines having other numbers of cylinders and other cylinder configurations and, in fact, has applicability to rotary engines having individual firing impulses. The engine 23 has a driven output shaft 25, which in the illustrated embodiment comprises the engine crankshaft.

Depending from the power head 22 is a drive shaft housing, indicated generally by the reference numeral 26. A coupling member, constructed in accordance with any one of the embodiments of the invention, identified by the reference numeral 27, is contained within the drive shaft housing 26 and rotatably couples a stub output shaft 28 that is splined to the crankshaft 25, in a manner to be described, to a drive shaft, indicated generally by the reference numeral 29. The drive shaft 29 extends into a lower unit, indicated generally by the reference numeral 31, wherein a conventional forward, neutral, reverse transmission 32 is positioned. The transmission 32 is adapted to selectively couple the drive shaft 29 to a propeller shaft 33 which, in turn, drives a propeller 34 in a known manner.

A vertically extending steering shaft 35 is connected to the drive shaft housing 26 in a known manner, as by upper and lower brackets 36 and 37. The steering shaft 35 is, in turn, journaled within a swivel bracket assembly 38 for steering of the outboard motor 21 about the vertically extending axis defined by the steering shaft 35.

The swivel bracket 38 is, in turn, connected to a clamping bracket 39 by means including a horizontally extending pivot pin 41 for tilting of the swivel bracket 38 and outboard motor 41 about a generally horizontally extending axis defined by the pivot pin 41. The clamping bracket 39 is adapted to be affixed to a transom 42 of an associated watercraft by means including clamping means 43.

The construction of the outboard motor 21, except for the coupling member 27, as described, is generally conventional. For this reason, a detailed description of the components of the outboard motor 21 has not been given. Rather, the general construction of the motor has been described so as to understood the environment in which the invention, consisting of the coupling member 27 and the specific embodiments of FIGS. 2 and 3, FIGS. 4 and 5, FIG. 6, FIGS. 7 and 8, FIGS. 9 and 10 and FIGS. 11 through 13 resides. Reference will now be had to these respective figures to describe the various embodiments of the invention.

EMBODIMENT OF FIGS. 2 AND 3

In the embodiment of FIGS. 2 and 3, the coupling member 37 for coupling the output shaft 28 with the drive shaft 29 includes a necked down section 44 that may be formed integrally with the output shaft 28 but which has substantially greater torsional resilience than the remainder of the shaft 28. The shaft 28 has external splines 45 formed at its upper end so as to afford a rotatable coupling with the crankshaft 25. A portion of the output shaft 28 between the splined end 45 and the reduced diameter portion 44 is provided with a further set of external splines 46. An internally splined end 47 of a tubular member 48 is non-rotatably coupled to the splined portion 46 so that the portions 48 and 28 will rotate in unison. The tubular member 48 has substantially less torsional resilience than the reduced diameter portion 44 of the shaft 28.

At its lower end, the reduced diameter shaft portion 44 has a cylindrical part 49 that is received within a complementary bore formed at the lower end of the tubular member 48. The portion 49 terminates in a male splined end 51 that has a splined coupling to a corresponding female splined portion of a sleeve 52. The sleeve 52, in turn, has a larger diameter splined opening 53 that non-rotatably couples it to a splined portion 54 of the drive shaft 29.

A lost motion connection is provided between the tubular member 48 and the sleeve 52 so as to afford the transmission of large driving thrusts once the reduced diameter portion 44 has torsionally deflected a predetermined amount. This comprises a plurality of downwardly extending lugs 55 that are formed at the lower end of the tubular member 48 and which interdigitate with corresponding upwardly extending lugs 56 of the sleeve 52. As seen in FIG. 3, when the device is unstressed, the lugs 55 are spaced from the lugs 56 by an angular dimension indicated by the angle $\theta$.

This embodiment works in the following manner. Under low engine speeds and low driving forces, the drive will be transmitted from the crankshaft 25 to the drive shaft 29 through the flexible reduced diameter portion 44 of the output shaft 28. There will be torsional fluctuations of the angular position as permitted by the clearance between the lugs 55 and the lugs 56 so that the shaft 44 may rotate through the angle $\theta$ relative to the tubular member 48 and absorb these low speed pulsations. This absorption will reduce the likelihood of vibration transmission to the transom 44 and hull and also will resist uneven driving impulses on the propeller 34 that might tend to cause rotation about the steering axis 35. As, however, the speed and power output of the engine 23 increases, the shaft reduced diameter portion 44 will torsionally deflect so that the lugs 56 will come into contact with the lugs 55 and the drive will be then through the more rigid tubular member 48.

EMBODIMENT OF FIGS. 4 AND 5

In the embodiment of FIGS. 2 and 3, the transition of drive from the more flexible shaft portion 44 to the more rigid shaft portion 48 was accomplished by a direct metal-to-metal contact. Of course, such an arrangement can itself introduce some noise into the system. FIGS. 4 and 5 illustrate an embodiment that is substantially the same as the embodiment of FIGS. 2 and 3, however, in this embodiment an arrangement is incorporated for reducing the noise during the transitional stage of operation. In this embodiment, many of the components are same as the previously described embodiment and these identical components have been identified by the same reference numeral.

In this embodiment, the sleeve 52 has the lugs 56. The lower end of the tubular member 48 also has a rigid lug 55 but is formed with a further integral cylindrical post 71 that has a dimension that is smaller than the width of the lug 55. The post 71 is encircled by a body of elastomeric material 72 that has an angular width greater than that of the lug 55. This elastomeric material is relatively rigid but nevertheless is more resilient than the metal portion 71.

This embodiment operates like the embodiment of FIG. 2 and 3 in that low speed driving loads are transmitted through the shaft reduced diameter portion 44 and its relatively high torsional resistance will absorb the low speed impulses. However, as the driving load increases and the shaft portion 44 deflects, the elastomeric body 72 will engage the lugs 56 and provide a more rigid coupling. This coupling continues until the elastomeric member 72 ahs deflected sufficiently so that the lugs 56 will engage the rigid lug 55 and transmit the majority of the driving force through the metal-to-metal contact. Thus, this embodiment provides the same advantages as the embodiments of FIGS. 2 and 3 but the noise generation during the transitional condition is substantially reduced.

EMBODIMENT OF FIG. 6

This embodiment is substantially the same as the embodiment of FIGS. 4 and 5. However, in this embodiment, the elastomeric member 72 is replaced by a formed leaf spring, indicated generally by the reference numeral 81. The leaf spring 81 has a central portion 82 that is received over and held in place frictionally with the pin 71. Integral outstanding arms 83 of the spring 81 are adapted to engage the lugs 56 so as to provide the same resilient function as the elastomeric body 72 of the previously described embodiment. Therefore, it is believed that the operation of this embodiment will be obvious to those skilled in the art.

EMBODIMENT OF FIGS. 7 AND 8

Figure 7:
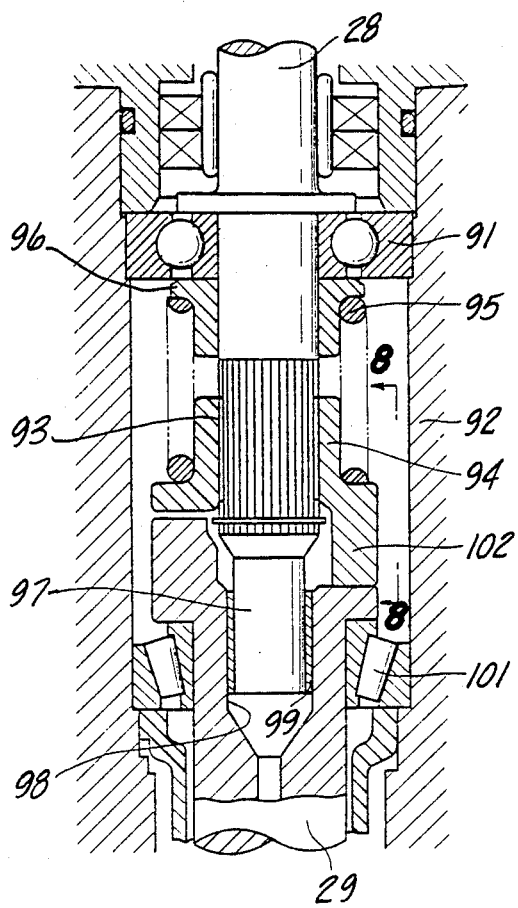
FIG. 7 is an enlarged cross-sectional view, in part similar to FIGS. 2 and 4, showing a fourth embodiment of the invention.
Figure 9:
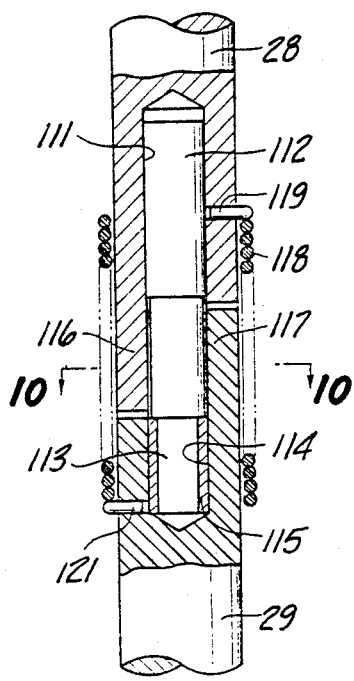
FIG. 9 is a cross-sectional view, in part similar to FIGS. 2, 4 and 7, showing a fifth embodiment of the invention.
Figure 10:
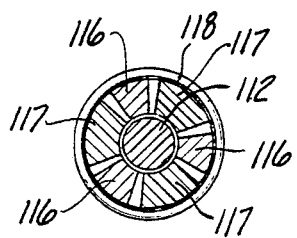
FIG. 10 is a cross-sectional view taken along the line 10—10 of FIG. 9.
Figure 8:
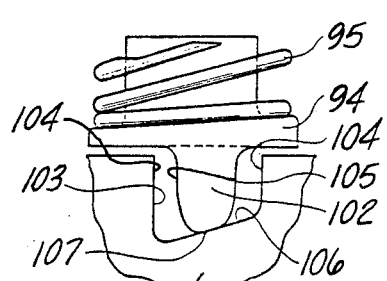
FIG. 8 is a view taken in the direction of the line 8—8 of the embodiment of FIG. 7.
Figure 11:
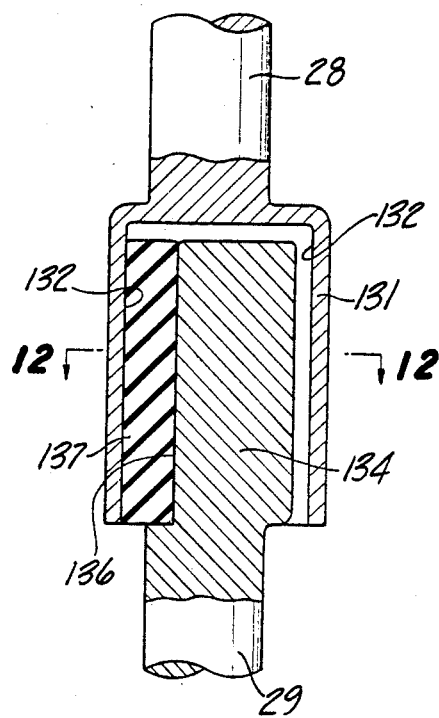
FIG. 11 is a cross-sectional view, in part similar to FIGS. 2, 4, 7 and 9, and shows yet another embodiment of the invention.

In the previously described embodiments of FIGS. 2 and 3, FIGS. 4 and 5, and FIG. 6, the sleeve 52 was provided for accomplishing the coupling between the shaft 28 and the drive shaft 29. FIGS. 7 and 8 show an arrangement embodying a different form of coupling and wherein the connection is directly to the drive shaft 29. In this embodiment, the output shaft 28 and drive shaft 29 have been identified by the same reference numerals, although they have a different overall configuration.

The output shaft 28 has an intermediate portion that is journaled by means of a anti-friction bearing 91 that is carried within a structural member 92 of the drive shaft housing. Below the bearing 91, the shaft 28 is provided with a male splined portion 93. This splined portion is received within and non-rotatably coupled to a female splined opening of a sleeve 94. The sleeve 94 is axially slidable relative to the shaft 28 and is urged in a downward direction by means of a coil compression spring 95 that encircles the lower portion of the shaft 28 and which bears against the sleeve 94 and a further bearing sleeve 96 positioned around the shaft 28.

The lower end of the output shaft 28 is formed with a pilot portion 97 that is received in an opening 98 formed in the upper end of the drive shaft 29. An anti-friction bushing 99 is interposed between the pilot portion 97 and the drive shaft opening 98 so as to journal this portion of the shaft 28.

The upper end of the drive shaft 29 is also journaled in the drive shaft housing structural member 92 by means of an anti-friction bearing 101.

The sleeve 94 is provided with a pair of diametrically opposed, axially extending lugs 102 that are received in specially formed recesses 103 formed in the upper end of the drive shaft 29 so as to provide a lost motion connection therebetween. The shape of the recesses 103 may be best understood by reference to FIG. 8. The recesses 103 are comprised of a pair of parallel side 104 that are spaced apart a distance greater than the width of the lugs 102. The lugs 102 have opposing side surfaces 105 that are normally spaced from the recess sides 104 when the device is not under load. The sides 104 of the recess 103 are joined by an inclined lower surface 106. A correspondingly inclined lower surface 107 of the lug 102 is urged into frictional engagement with the surface 106 by the spring 95.

This embodiment acts in the following manner. Under low engine speeds and low load transmissions, the force of the spring 95 acting between the surfaces 106 and 107 will be sufficient to effect transmission of rotation from the output shaft 28 to the drive shaft 29. The inclination of the surfaces 106 and 107 assist in this operation. It is to be understood, however, that the inclination may be dispensed with and the driving load transmitted solely through the frictional engagement. However, any fluctuations caused by driving impulses of the engine will be absorbed by relatively rotation as with the previously described embodiments. As the driving load increases, eventually the lug 102 will engage one of the surfaces 104 and provide a direct mechanical transission of power. In other regards, this embodiment operates the same as the previously described embodiments and its operation is believed to be clear to those skilled in the art.

EMBODIMENT OF FIGS. 9 AND 10

This embodiment, like the embodiment of FIGS. 7 and 8, eliminates the coupling sleeve as used in the embodiments of FIGS. 2 and 4, FIGS. 4 and 5, and FIG. 6. Again, the output shaft 28 and drive shaft 29 are identified by the same reference numerals, even though they have a slightly different configuration.

In this embodiment, the lower end of the output shaft 28 is provided with a bore 111 into which a pin 112 is pressed. The pin 112 has a reduced diameter portion 113 that is received within a bore 114 formed in the upper end of the drive shaft 29 and which is supported by an anti-friction bushing 115 that is received in the bore 114.

In this embodiment, the output shaft 28 is formed with three depending lugs 116 that are received in respective gaps formed between upstanding lugs 117 formed on the upper end of the drive shaft 29 so as to provide the lost motion connection between the shafts 28 and 29.

A torsionally resilient spring clutch consisting of a spring 118 encircles the shafts 28 and 29 for transmitting low speed and low load rotational movement between these two shafts. The spring 118 has one end 119 that is pinned into a radially extending bore of the shaft 28 and its other end 121 pinned into a radially extending bore of the shaft 129. The hand of the spring 118 is such that it will increase its tension in the direction of normal driving rotation of the shaft 28.

This embodiment operates like the previously described embodiments. That is, low speed driving forces will be transmitted from the shaft 28 to the shaft 29 through a torsionally resilient element, in this embodiment the spring clutch 118. The spring clutch 118 will, therefore, absorb fluctuations in rotation caused by the driving impulses of the engine. However, as the speed and load increases, the spring 118 will progressively deflect so that the lugs 116 and 117 will move into engagement so as to provide a positive drive and high power transmission capabilities.

EMBODIMENT OF FIGS. 11 THROUGH 13

In this embodiment, the lower end of the output shaft 28 is provided with a depending flange 131 that defines an internal cavity 132. As may be readily seen from FIGS. 12 and 13, the flange 131 and cavity 132 have a generally triangular configuration with apices 133 that are interconnected by curved intermediate portions. The intermediate portions are convex as viewed in these figures.

The upper end of the drive shaft 29 has a projecting portion 134 that extends into the cavity 132. The portion 134 is also triangular in shape and has apices 135 that are joined concave intermediate faces 136. The apices 135 have a lesser radial extent than the cavity apices 133. However, they are great enough in radius so as to contact the cavity sides 132 to provide a lost motion connection between the shafts 28 and 29, in a manner to be described.

Three blocks of elastomeric material 137 are interposed between the sides 136 of the projecting portion 134 and the corresponding sides of the output shaft recess 132. The elastomeric members 137 are relatively resilient so as to provide torsional resilience under low driving speeds and loads so as to accomplish vibration damping, as with the aforedescribed embodiments.

Figure 12:
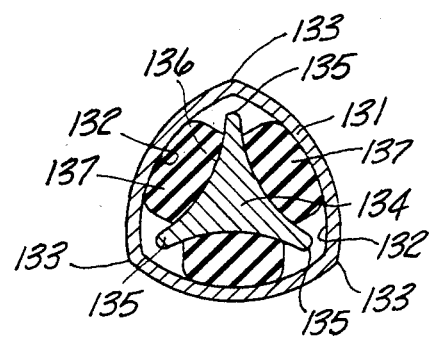
FIG. 12 is a cross-sectional view taken along the line 12—12 showing the condition in the unloaded state.
Figure 13:
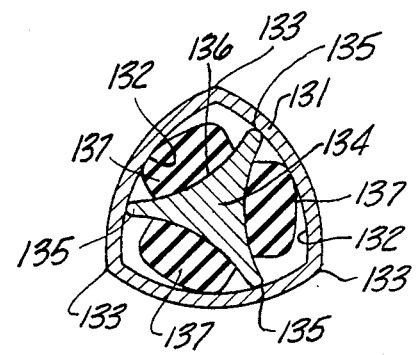
FIG. 13 is a cross-sectional view, in part similar to FIG. 12, showing the driving condition when large loads are being transmitted.

FIG. 12 shows the condition under no load. The apices 135 are spaced from the sides that define the cavity 132 and all rotational driving loads under this condition will be transmitted through the elastomeric members 137. Thus, there can be torsional resilience afforded by the elastomeric members 137 that will dampen the impulses of the driving engine and permit relative rotation between the shafts 28 and 29. As the load of driving increases, however, the deflection of the elastomeric members 137 will permit the apices 135 to engage the walls that define the opening 132 and there will be direct mechanical drive thus enjoying the advantages of the previously described embodiments.

From the foregoing description, it should be readily apparent to those skilled in the art that a number of embodiments of the invention have been illustrated and described, each of which provides good vibration damping and force absorption under low speed and load conditions. This damping is provided by a first coupling portion that is relatively elastic in a torsional sense. However, as the driving loads are increased, the drive will be transferred to a second more rigid coupling portion so as to afford good power output and power transmission.

Although a number of embodiments of the invention have been illustrated and described, various changes and modifications may be made without departing from the spirit and scope of the invention, as defined by the appended claims.

We claim:

1. In a marine drive having an output shaft driven by an engine having firing impulses, a drive shaft housing rotatably journaling a drive shaft, a lower unit fixed to said drive shaft housing and journaling a propeller shaft for powering an associated watercraft and coupling means for drivingly coupling said output shaft and said drive shaft, the improvement comprising said coupling means including an elongated torsion bar fixed at one end for rotation with said output shaft, a first element fixed to the other end of said torsion bar and said drive shaft, a tubular element fixed at one end to said torsion bar and encircling said torsion bar and terminating contiguous to the other end thereof, a lost motion connection between said first and said tubular elements defined by a first pair of spaced apart lugs permitting a predetermined degree of relative rotation therebetween corresponding to the low speed firing impulses of said engine, said torsion bar providing a first relatively low torsional resistance to absorb low load vibrations during said predetermined degree of relative rotation, resilient stop means surrounding one of said lugs for providing a resilient transmission of high loads after said first and tubular elements have undergone said predetermined degree of relative rotation, and a second pair of spaced apart lug means on said first and said tubular elements providing positive stop means for limiting the deflection of said resilient stop means.

2. In a marine drive as set forth in claim 1 wherein the resilient stop means comprises an elastomeric block.

3. In a marine drive as set forth in claim 1 wherein the resilient stop means comprises a leaf spring.

4. In a marine drive having an output shaft driven by an engine having firing impulses, a drive shaft housing rotatably journaling a drive shaft, a lower unit fixed to said drive shaft housing and journaling a propeller shaft for powering an associated watercraft and coupling means for drivingly coupling said output shaft and said drive shaft, the improvement comprising said coupling means including a first element fixed for rotation with said output shaft, a second element fixed for rotation with said drive shaft, a lost motion connection between said first and said second elements permitting a predetermined degree of relative rotation therebetween corresponding to the low speed firing impulses of said engine, a first coupling means portion providing a first relatively low torsional resistance to absorb low load vibrations during said predetermined degree of relative rotation, and a second coupling means portion cooperating said first and said second elements for providing a second substantially higher torsional resistance to transmit high loads after said first and second elements have undergone said predetermined degree of relative rotation, said first coupling means comprising a coil spring urging a coupling element into frictional engagement with means rotatably carried by the drive shaft, said coupling element comprising the first element.

5. In a marine drive as set forth in claim 4 wherein the frictionally engaging surfaces of the coupling member and the drive shaft are disposed at an angle.

6. In a marine drive having an output shaft driven by an engine having firing impulses, a drive shaft housing rotatably journaling a drive shaft, a lower unit fixed to said drive shaft housing and journaling a propeller shaft for powering an associated watercraft and coupling means for drivingly coupling said output shaft and said drive shaft, the improvement comprising said coupling means including a first element fixed against rotation relative to said output shaft, a second element fixed against rotation relative to said drive shaft, a lost motion connection between said first and said second elements permitting a predetermined degree of relative rotation therebetween corresponding to the low speed firing impulses of said engine, a first coupling means portion providing a first relatively low torsional resistance to absorb low load vibrations during said predetermined degree of relative rotation, and a second coupling means portion cooperating between said first and said second elements for providing a second substantially higher torsional resistance to transmit high loads after said first and second elements have undergone said predetermined degree of relative rotation, said coupling means comprises a coupling element fixed for rotation with said output shaft and axially movable relative thereto, a coil compression spring encircling said output shaft and urging said coupling element in an axial direction, said drive shaft having an opening formed therein receiving a pilot portion of said output shaft, said output shaft defining a recess, lug means formed on said coupling element and extending into said recess, the side walls of said lug means being spaced from the side walls of said recess for providing the lost motion connection and the second coupling means portion, said coil spring means urging the end of said lug means into engagement with a wall formed at the base of said recess for frictionally transmitting drive between said coupling element and said drive shaft for forming the first coupling means portion.

* * * * *